United States Patent
Callou et al.

(10) Patent No.: US 9,488,978 B2
(45) Date of Patent: Nov. 8, 2016

(54) METHOD FOR CONTROLLING A MULTI-ROTOR ROTARY-WING DRONE, WITH CROSS WIND AND ACCELEROMETER BIAS ESTIMATION AND COMPENSATION

(71) Applicant: PARROT, Paris (FR)

(72) Inventors: Francois Callou, Paris (FR); Gilles Foinet, Paris (FR)

(73) Assignee: PARROT, Paris (FR)

( * ) Notice: Subject to any disclaimer, the term of this patent is extended or adjusted under 35 U.S.C. 154(b) by 0 days.

(21) Appl. No.: 14/388,761

(22) PCT Filed: Mar. 27, 2013

(86) PCT No.: PCT/FR2013/050663
§ 371 (c)(1),
(2) Date: Sep. 26, 2014

(87) PCT Pub. No.: WO2013/144508
PCT Pub. Date: Oct. 3, 2013

(65) Prior Publication Data
US 2015/0057844 A1   Feb. 26, 2015

(30) Foreign Application Priority Data

Mar. 30, 2012  (FR) ...................................... 12 52895
Mar. 27, 2013  (WO) ................. PCT/FR2013/050663

(51) Int. Cl.
G05D 1/00    (2006.01)
G05D 1/02    (2006.01)
B64C 27/08   (2006.01)
B64C 39/02   (2006.01)

(52) U.S. Cl.
CPC ............. *G05D 1/0011* (2013.01); *B64C 27/08* (2013.01); *B64C 39/024* (2013.01);

(Continued)

(58) Field of Classification Search
CPC .. G05D 1/0204; G05D 1/0011; G05D 1/042; G05D 1/0038; G05D 1/0858; B64C 27/08; B64C 39/024; B64C 2201/146; A63H 27/12; G01C 5/005
USPC ............ 701/2, 26, 3, 23, 31.7, 468, 408, 11; 244/17.13, 17.23, 17.11, 177, 183, 244/17.17; 345/173; 348/114
See application file for complete search history.

(56) References Cited

U.S. PATENT DOCUMENTS

2004/0024500 A1    2/2004  Campbell
2004/0245378 A1*  12/2004  Nonami ................ A63H 27/12
                                                            244/17.13

(Continued)

OTHER PUBLICATIONS

Waslander and Wang • ("Wind Disturbance Estimation and Rejection for Quadrotor Position Control", AAA Infotech@ Aerosapce Conferecne and AIAA Unmanned . . . Unlimited Conference, Apr. 6-9, 2009,Seattle, Washington, vol. AIAA 2009-1983, Apr. 9, 2009, pp. 1-14, XP009164233, Seattle, Washington).*

(Continued)

*Primary Examiner* — Muhammad Shafi
(74) *Attorney, Agent, or Firm* — Haverstock & Owens LLP

(57) ABSTRACT

The attitude and speed of the drone are controlled by angular commands applied to a control loop (120) for controlling the engines of the drone according to the pitch and roll axes. A dynamic model of the drone, including, in particular, a Kalman predictive filter, represents the horizontal speed components of the drone on the basis of the drone mass and drag coefficients, the Euler angles of the drone relative to an absolute terrestrial reference, and the rotation of same about a vertical axis. The acceleration of the drone along the three axes and the relative speed of same in relation to the ground are measured and applied to the model as to estimate (128) the horizontal speed components of the cross wind. This estimation can be used to generate corrective commands (126) that are combined with the angular commands applied to the control loop of the drone in terms of pitch and roll.

10 Claims, 4 Drawing Sheets

(52) U.S. Cl.
CPC ...... *G05D 1/0204* (2013.01); *B64C 2201/024* (2013.01); *B64C 2201/14* (2013.01); *B64C 2201/141* (2013.01); *B64C 2201/146* (2013.01)

(56) References Cited

U.S. PATENT DOCUMENTS

| | | | | |
|---|---|---|---|---|
| 2005/0048918 | A1* | 3/2005 | Frost | A63H 30/04 455/41.2 |
| 2009/0284553 | A1* | 11/2009 | Seydoux | A63F 13/10 345/649 |
| 2010/0070105 | A1* | 3/2010 | Larkin | G05D 1/0858 701/1 |
| 2011/0049290 | A1* | 3/2011 | Seydoux | A63H 27/12 244/17.13 |
| 2011/0295569 | A1 | 12/2011 | Hamke et al. | |
| 2012/0091260 | A1* | 4/2012 | Callou | G05D 1/0858 244/17.13 |
| 2012/0158215 | A1* | 6/2012 | Sun | B64C 27/20 701/3 |
| 2012/0241553 | A1* | 9/2012 | Wilke | B64C 27/08 244/17.13 |

OTHER PUBLICATIONS

Waslander and Wang o ("Wind Disturbance Estimation and Rejection for Quadrotor Position Control", AAA Infotech@ Aerosapce Conferecne and AIAA Unmanned . . . Unlimited Conference, Apr. 6-9, 2009,Seattle, Washington, vol. AIAA 2009-1983, Apr. 9, 2009, pp. 1-14, XP009164233, Seattle, Washington).*

Jinhyun Kim et al., "Accurate Modeling and Robust Hovering Control for a Quad-Rotor VTOL Aircraft", Journal of Intelligent and Robotic Systems, vol. 57, No. 1-4, Sep. 17, 2009, XP019770258, ISSN: 1573-0409.

Mokhtari et al., "Dynamic Feedback Controller of Euler Angles and Wind Parameters Estimationfor a Quadrotor Unmanned Aerial Vehicle" , Robotics and Automation, 2004, vol. 3, Apr. 26, 2004, XP010768473.

Steven L. Waslander et al., "Wind Disturbance Estimation and Rejection for Quadrotor Position Control", XP009164233, Apr. 9, 2009, pp. 1-14.

* cited by examiner

METHOD FOR CONTROLLING A MULTI-ROTOR ROTARY-WING DRONE, WITH CROSS WIND AND ACCELEROMETER BIAS ESTIMATION AND COMPENSATION

The invention relates to the rotary-wing drones such as quadricopters or the like.

Such drones are provided with multiple rotors driven by respective motors that can be controlled in a differentiated manner so as to pilot the drone in attitude and speed.

A typical example of such a drone is the AR.Drone of Parrot SA, Paris, France, which is a quadricopter equipped with a series of sensors (accelerometers, three-axis gyrometers, altimeter), a front camera picking up an image of the scene towards which the drone is directed, and a vertical-view camera picking up an image of the overflown ground.

The documents WO 2010/061099 A2 and EP 2 364 757 A1 (Parrot SA) describe such a drone, as well as the principle of piloting the latter through a phone or a multimedia player having a touch screen and an integrated accelerometer, for example a cellular phone of the iPhone type or a player or a multimedia tablet of the iPod Touch or iPad type (registered trademarks of Apple Inc., USA).

More precisely, in this operating mode that will be called hereinafter "controlled mode", the drone is piloted by the user by means of signals emitted by the device inclination sensor, which inclinations are replicated by the drone: for example, to make the drone move forward, the user tilts his device about the pitch axis thereof, and to move the drone aside to the right or to the left, he tilts said device with respect to the roll axis thereof. That way, if the drone is controlled so as to tilt or "dive" downward (inclination according to a pitch angle), it will move forward with a speed that is all the more high that the inclination angle is important; conversely, if it is controlled so as to "nose up" in the opposite direction, its speed will progressively slow down, then will invert, going back rearward. In the same way, for a control of inclination about a roll axis, the drone will lean to the right or to the left, causing a linear displacement in horizontal translation to the right or to the left.

The user has at his disposal other commands, which are displayed on the touch screen, in particular "climb/descent" (throttle control) and "right rotation/left rotation" (rotation of the drone about its yaw axis).

The drone is also provided with a command for switching to a fixed-point condition: in this operating mode, called hereinafter "auto-controlled mode", when the user releases all the commands of its remote-control device, the drone is immobilized and stabilized in a fixed-point condition in a fully automatic manner.

The general problem of the invention is piloting such a drone in wind.

It will be called "wind" a displacement of air parallel to the ground, constant in space and in time (wind gusts will not be considered). Such a "wind" is then fully determined by its horizontal speed components in a given terrestrial coordinate system, or by its norm and its direction in such a coordinate system.

The wind represents a perturbation that, by its characteristics, affects the drone when the latter is in flight. Such perturbations are particularly noticeable in case of very light-weight "micro-drones", such as the above-mentioned AR.Drone, whose mass is only of a few hundreds of grams. The windage of such a drone is hence particularly noticeable, even with moderate wind.

In order to move, the drone leans on a mass of air mobile as a function of wind, while measuring relative to the ground its components of horizontal speed (for example, by means of a camera pointing downward and giving an image of the ground), angles (by the on-board accelerometers and gyrometers) and external forces that are applied thereto (by the on-board accelerometers).

In the absence of wind, the drone can keep a null speed and thus a fixed position by maintaining a null pitch. It is hence essential to accurately measure this neutral state.

Now, accelerometers have by construction a bias (supposed to be constant over the short term), which it is necessary to estimate and compensate for, so as to use correctly the acceleration measurement in the reconstruction of the angles. The accelerometers being among other things used as inclinometers, an error of estimation of the accelerometer biases causes a bias on the angle measurement, which is harmful to the maintaining of the fixed point. Likewise, this sensor bias has an influence on the measurement of the wind forces performed by the accelerometer.

In presence of wind, the drone must be tilted to compensate for the wind and to maintain the fixed point (controlled based on a stable image of the vertical camera): its pitch will hence be no null and the bias evaluation will be modified. This does not prevent the drone from being maintained in a fixed-point condition (controlled by the camera), but this will have a particularly noticeable incidence in two cases:

in fixed-point condition, during a yaw movement only (rotation about a vertical axis, with no front/rear nor right/left displacement): as the drone was tilted in a precise direction in order to counter the wind, as soon as it begins to turn, its inclination no longer corresponds to the wind compensation direction but forms an angle with the latter: therefore, the drone will "go in the wind" and will no longer keep its fixed point;
 in controlled piloting, the displacements in the wind direction are accentuated, whereas the displacements in the direction opposite to the wind direction are slowed down, or even made impossible.

One of the objects of the invention is to propose a wind estimation method allowing to make the distinction between the accelerometer construction bias and the measurement bias induced by the wind.

Another object of the invention is to propose a wind compensation method allowing to make up for the two just-described phenomena, i.e. i) in auto-piloted flight, allowing the drone to maintain its fixed-point condition in the wind during a yaw movement, and ii) in controlled mode, allowing a displacement control that is identical in all the directions, whether it is in the wind direction or in the direction opposite to the wind direction, transparently for the pilot.

The FR 2 926 637 A1 describes a system for estimating the speed of a drone relative to air, by application of a model expressing the mechanical relations between the forces acting on the drone and its translational and rotational speeds and accelerations. The speed relative to air is estimated in particular based on the aerodynamic drag force acting against the displacement of the drone, which is indirectly measured and used to obtain information about the speed relative to air.

To measure the wind speed, i.e. the difference between i) the speed of the drone relative to air and ii) the speed of the drone relative to the ground, this document proposes to use an on-board GPS receiver measuring the speed of the drone relative to the ground. This way to operate however requires the presence of such a receiver in the drone, and requires that a GPS signal is available and that the accuracy thereof is sufficient (visibility of a sufficient number of satellites). In any case, the accuracy obtained does not provide a fine enough estimation of the wind speed to correctly evaluate the part due to the wind of the measurement bias of the accelerometer sensor, required to compensate for the above-mentioned drawbacks of piloting in the wind.

The article of Waslander et al. "Wind Disturbance Estimation and Rejection for Quadrotor Position Control", *AIAA Inforech@Aerospace Conference and AIAA Unmanned . . . Unlimited Conference*, American Institute of Aeronautics and Astronautics, Seattle, Wash., April 2009, describes a technique of evaluation and compensation of the measurement bias introduced by the wind, but it does not take into account the construction bias of the drone accelerometers. Indeed, the estimation of this bias is not always necessary, in particular if the drone is provided with quality sensors of sufficient accuracy.

On the other hand, for consumer goods provided with less efficient sensors, the presence of this construction bias is liable to distort the measurements and thus the compensation parameters that are applied to the motors of the drone.

In particular, the evaluation of the drone angle may be strongly affected by this construction bias of the accelerometers.

To solve these problems and to achieve the above-mentioned goals, the invention proposes a technique allowing to estimate the bias of the accelerometer sensor independently of that introduced by the wind.

Indeed, as the construction bias of the accelerometers and the effect of wind are expressed in coordinate systems that are not identical, it is advisable to decorrelate from each other these two types of bias, of different nature.

The invention also proposes a compensation technique allowing to use the results of the bias estimation to correct the above-mentioned defects of piloting in the wind, both in the auto-piloted mode (fixed point) and in the controlled mode (piloting commands applied by a user).

More precisely, the invention proposes a method for piloting a rotary-wing drone with multiple rotors driven by respective motors able to be controlled to pilot the drone in attitude and speed, said method comprising, in a manner known in itself from the above-mentioned article of Waslander:

the generation of angular set-points and the application of these set-points to a control loop of the drone motors, these set-points being adapted to control the attitude of the drone about pitch and roll axes, the establishment of at least one dynamic model of the drone, describing horizontal speed components of the drone as a function of the drag coefficients and the mass of the drone, of the Euler angles characterizing the attitude of the drone with respect to an absolute terrestrial coordinate system, as well as of the rotational speed of the drone about a vertical yaw axis;

the measurement of the aerodynamic drag force of the drone, derived from a measurement of acceleration of the drone;

the measurement of the relative speed of the drone with respect to the ground; and the application to said dynamic model of the drone, by a Kalman predictive filter, of said measurements of aerodynamic drag force and of speed relative to the ground, so as to produce an estimation of the horizontal speed components of the cross wind.

Characteristically of the present invention, the Kalman predictive filter is a six-state filter, such states comprising:

two components of the speed of displacement of the drone relative to the ground, expressed in a coordinate system linked to the drone, two components of the speed of wind relative to the ground, expressed in an absolute terrestrial coordinate system linked, and two horizontal components of drone accelerometer bias.

Advantageously, the establishment of the dynamic model of the drone comprises the establishment of two distinct models, with: i) a dynamic model of the drone in flight, and ii) a dynamic model of the drone on the ground, these models being used selectively as a function of the state of the drone.

Advantageously, the dynamic model of the drone in flight can use a measurement of acceleration of the drone as a measurement proportional to the speed of air in the coordinate system of the drone.

The dynamic model of the drone in flight may in particular by of the type:

$$\dot{X} = \begin{pmatrix} \begin{pmatrix} -\frac{C_x}{m} & \omega_z \\ -\omega_z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix} X + \begin{pmatrix} \begin{pmatrix} -\sin(\theta) \\ \sin(\phi) \end{pmatrix} \\ \begin{pmatrix} 0 \\ 0 \end{pmatrix} \\ \begin{pmatrix} 0 \\ 0 \end{pmatrix} \end{pmatrix} \cdot U$$

$\dot{X}$ representing the evolution of the state vector relative to its initial value X, the input U of the system being the gravity U=g, $C_x$ and $C_y$ being the aerodynamic friction coefficients of the drone along its axes u and v, m being the mass of the drone, $\phi$, $\theta$ and $\psi$ being the Euler angles (respectively of roll, pitch and yaw) characterizing the attitude of the drone relative to the NED coordinate system, $\omega_z$ being the rate of rotation about the axis w (yaw rotation movement), and $R\psi$ being the rotation matrix associated with the angle $\psi$, in dimension 2. The dynamic model of the drone on the ground may in particular be of the type:

$$\dot{X} = \begin{pmatrix} \begin{pmatrix} \frac{-1}{\tau} & 0 \\ 0 & \frac{-1}{\tau} \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} \frac{-1}{\tau} & 0 \\ 0 & \frac{-1}{\tau} \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix} X + \begin{pmatrix} \begin{pmatrix} 0 \\ 0 \end{pmatrix} \\ \begin{pmatrix} 0 \\ 0 \end{pmatrix} \\ \begin{pmatrix} 0 \\ 0 \end{pmatrix} \end{pmatrix} \cdot U$$

$\dot{X}$ representing the evolution of the state vector relative to its initial value X, U being the gravity U=g, and $\tau$ being a time parameter of progressive decrease of the wind speed estimation.

The invention also proposes a step of compensation for the effect of cross wind on the positioning and the displacements of the drone, by generating corrective set-points, function of the estimated components of horizontal speed of the cross wind, and combining these corrective set-points to the angular set-points of pitch and roll applied to the control loop of the drone motors.

The corrective set-points may in particular be of the type:

$$\theta_{wind\_comp} = \frac{Cx}{g} V_{wind} \cdot \cos(\psi_{wind} - \psi_{drone})$$

$$\phi_{wind\_comp} = -\frac{Cx}{g} V_{wind} \cdot \sin(\psi_{wind} - \psi_{drone})$$

$V_{wind}$ being the modulus of the estimated wind speed, Cx being the drag coefficient of the drone, $\psi_{wind}$ being the heading angle of the wind direction and $\psi_{drone}$ drone being the heading angle of the drone direction.

The compensation step may in particular comprise the definition for the drone of an open-loop reference pitch. When the drone is in user-controlled flight, the corrective set-points are combined to the piloting set-points applied by the user. When the drone is in auto-piloted standstill flight, these corrective set-points are combined to fixed-point stabilization set-points produced in response to a measurement of the horizontal speed of the drone relative to the ground.

An exemplary embodiment of the device of the invention will now be described, in relation with the appended drawings in which the same numerical references denote identical or functionally similar elements through the figures.

Figure 1:
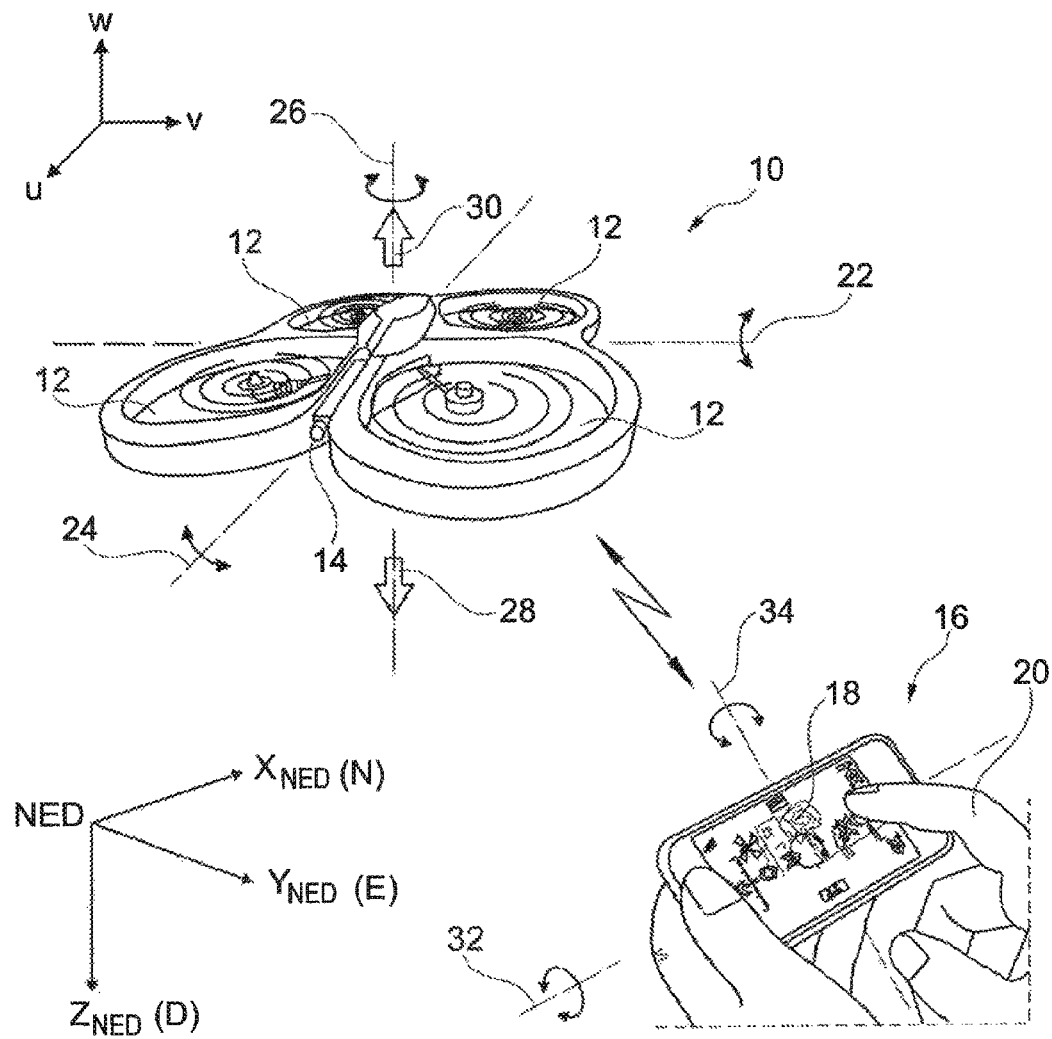
FIG. 1 is an overall view showing the drone and the associated remote-control device for the remote piloting thereof.

In FIG. 1, the reference 10 generally denotes a drone, for example a quadricopter such as the A.R.Drone of Parrot SA, Paris, France, described in the above-mentioned WO 2010/061099 A2 and EP 2 364 757 A1, as well as in the FR 2 915 569 A1 (which describes in particular the control system with gyrometers and accelerometers used by the drone). The drone 10 includes four coplanar rotors 12, whose motors are controlled independently by an integrated navigation and attitude control system. It is provided with a first front-view camera 14, which allows to obtain an image of the scene towards which is oriented the drone, for example a CMOS-sensor wide-angle camera.

The drone also includes a second, vertical-view camera (not visible in FIG. 1) pointing downward, adapted to pick up successive images of the overflown ground and used in particular to evaluate the speed of the drone relative to the ground.

Inertial sensors (accelerometers and gyrometers) allow to measure with a certain accuracy the angular speeds and the attitude angles of the drone, i.e. the Euler angles describing the drone inclination. Generally, by "inclination", it will be meant the inclination of the drone with respect to a horizontal plane of a fixed terrestrial coordinate system, it being understood that the two longitudinal and transverse components of the horizontal speed are intimately linked to the inclination about to the two respective pitch and roll axes of the drone.

Two coordinate systems may be considered in the following, according to the case:
 a local coordinate system {u, v, w} linked to the body of the drone: the drone, although being strongly symmetrical by construction, includes a front and a rear, and the position of the camera will be considered as pointing forward, hence defining the axis u. The axis v is perpendicular to u in the mid-plane of the drone, and the axis w is the vertical axis directed towards the ground;
 an absolute coordinate system of the NED (North East Down) type, which is a fixed terrestrial coordinate system, in particular a geographic coordinate system $\{X_{NED}, Y_{NED}, Z_{NED}\}$: the axis $X_{NED}$ corresponds for example to the direction of the magnetic North, the direction $Y_{NED}$ is the direction parallel to the plane of the ground perpendicular to the geographic North (i.e. the geographic East), and the direction $Z_{NED}$ is perpendicular to the plane of the ground and oriented downward.

An ultrasound telemeter arranged under the drone and an on-board barometer sensor moreover provide measurements that, when combined together, give an estimation of the drone altitude with respect to the ground. As regards the linear speed of translation of the drone in a horizontal plane with respect to the ground, this speed is evaluated by analysis of the image provided by the vertical-view camera of the drone in combination with the accelerometer data, thanks to a software that estimates the displacement of the scene picked up by the camera from one image to the following, and applies to this estimated displacement a scale factor that is function of the measured altitude. This technique is described in detail in the EP 2 400 460 A1 (Parrot SA), to which reference may be made for more details.

The drone 10 is piloted by a remote-control device 16 provided with a touch screen 18 displaying the image taken on-board by the front camera 14, with in superimposition a number of symbols allowing the activation of piloting commands by simple contact of a user's finger 20 on the touch screen 18. The device 16 is provided with means for radio link with the drone for the bidirectional exchange of data from the drone 10 to the device 16, in particular for the transmission of the image picked up by the camera 14, and from the device 16 to the drone 10 for the sending of piloting commands. This link may be, for example, of the Wi-Fi (IEEE 802.11) or Bluetooth local network type (which are registered trademarks). The device 16 is also provided with inclination sensors allowing to control the attitude of the drone by imparting corresponding inclinations to the device.

As indicated in introduction, the remote-control device 16 is advantageously consisted by a phone or a multimedia player having a touch screen and an integrated accelerometer, for example a cellular phone of the iPhone type, a player of the iPod Touch type or a multimedia tablet of the iPad type, which are devices incorporating the various organs of control required for the display and detection of the piloting commands, the visualization of the image picked up by the front camera, and the bidirectional data exchange with the drone by Wi-Fi or Bluetooth link.

The piloting of the drone 10 consists in making the latter progress by controlling the motors in a differentiated manner to generate, according to the case, movements of:

a) rotation about a pitch axis 22, to make the drone move forward or reward; and/or
b) rotation about a roll axis 24, to move the drone aside to the right or to the left; and/or
c) rotation about a yaw axis 26, to make the main axis of the drone rotate to the right or to the left; and/or
d) translation downward 28 or upward 30 by changing the gas regime, so as to reduce or increase, respectively, the altitude of the drone.

When these piloting commands are applied by the user from the remote-control device 16 (configuration of "controlled piloting", controlled by a user), the commands a) and b) of pivoting about pitch 22 and roll 24 axes are obtained by inclinations of the device 16 about is longitudinal axis 32 and its transverse axis 34, respectively; for example, to make the drone move forward, it is just needed to incline the device forward by tilting it about the axis 32, to move it aside to the right, it is just needed to incline the device by tilting it towards the right about the axis 34, etc. The commands c) and d) result from actions applied by the contact of the user's finger 20 (generally the right finger) on corresponding specific areas of the touch screen 18.

Reference may be made to the above-mentioned WO 2010/061099 A2 and EP 2 364 757 A1 for more details about these aspects of the system. The drone has also an automatic and autonomous system of standstill flight stabilization (auto-piloted "fixed-point" configuration), activated in particular as soon as the user removes his finger from the touch screen of the device, or automatically at the end of the lift-off phase, or also in case of interruption of the radio link between the device and the drone. The drone then switches to a lift condition in which it will be automatically immobilized and stabilized, without any intervention of the user.

Control and Servo-Control of the Drone Motors

Figure 2:
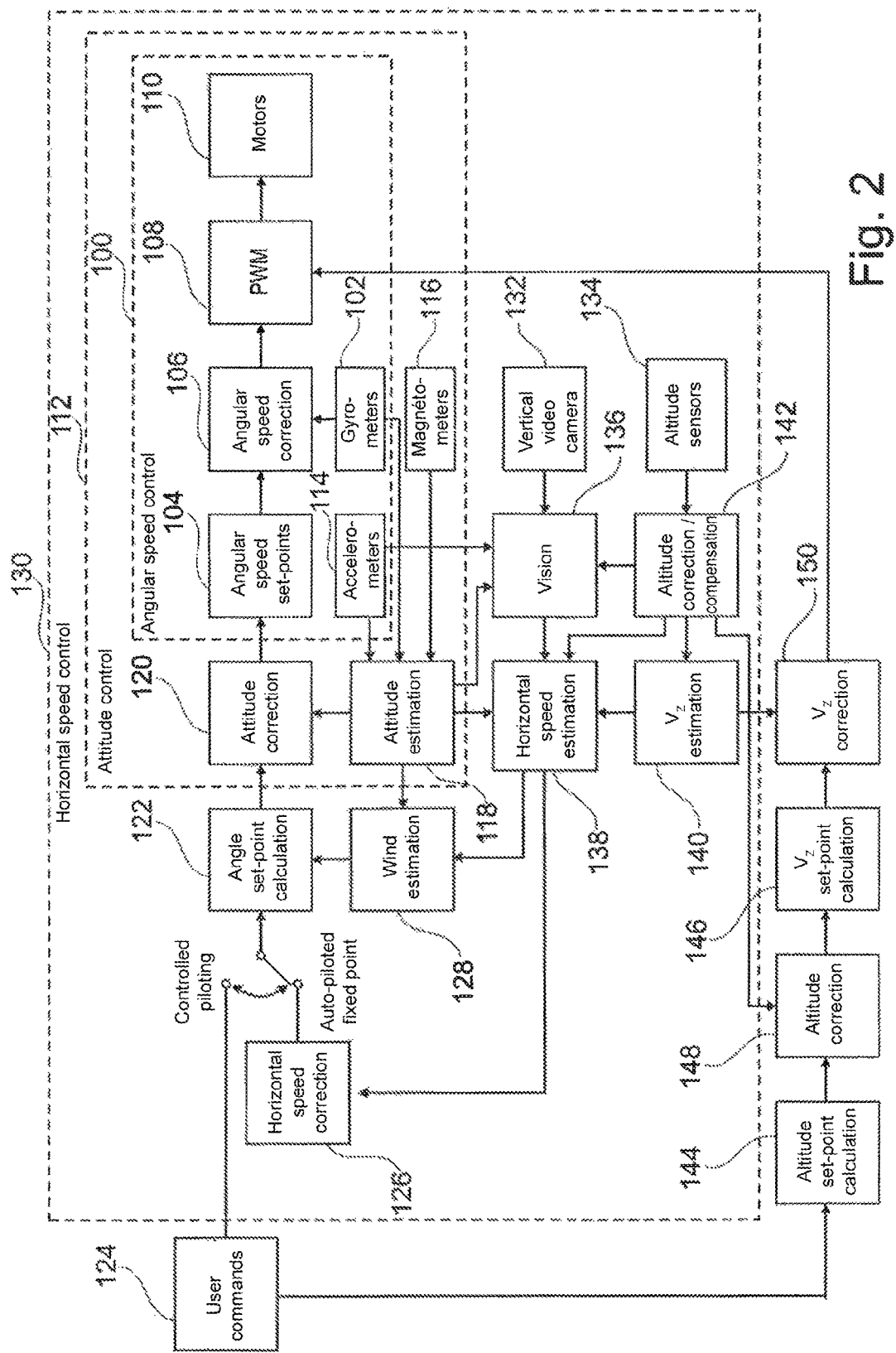
FIG. 2 is a block diagram of the different organs of control, servo-control and assisted piloting of the drone.

The way the piloting set-points for the motors of the drone are defined will now be exposed, with reference to FIG. 2, which is a functional-block diagram of the various organs of control and servo-control of the drone.

It will be noted that, although these diagrams are presented as interconnected circuits, the various functions are essentially software-implemented, this representation being only illustrative.

Generally, as illustrated in FIG. 2, the piloting system involves several imbricated loops for the control of the horizontal speed, the angular speed and the attitude of the drone, in addition to the altitude variations.

The most central loop, which is the angular speed control loop 100, uses on the one hand the signals provided by gyrometers 102, and on the other hand, a reference consisted by angular speed set-points 104. These various pieces of information are applied at the input of an angular speed correction stage 106, which itself pilots a control stage 108 for controlling the motors 110 so as to regulate separately the regime of the various motors to correct the angular speed of the drone by the combined action of the rotors driven by these motors.

The angular speed control loop 100 is imbricated in an attitude control loop 112, which operates based on the indications provided by the gyrometers 120, by accelerometers 114 and by a magnetometer 116 giving the absolute orientation of the drone in a terrestrial geomagnetic coordinate system. The data delivered by these various sensors are applied to an attitude estimation stage 118 of the PI (Proportional-Integrator) type. The stage 118 produces an estimation of the real attitude of the drone, applied to an attitude correction stage 120 that compares the real attitude to angle set-points generated by a circuit 122 based on commands directly applied by the user 124 ("controlled piloting" configuration) and/or data generated internally by the automatic pilot of the drone, via a horizontal speed correction circuit 126, to keep the drone in a standstill position (auto-piloted "fixed-position" configuration). The possibly corrected set-points applied to the circuit 120 and compared with the real attitude of the drone are transmitted by the circuit 120 to the circuit 104 to suitably control the motors.

To sum up, based on the error between the set-point (applied by the user and/or generated internally) and the angle measurement (given by the attitude estimation circuit 118), the attitude control loop 112 calculates an angular speed set-point using the PI corrector of the circuit 120. The angular speed control loop 100 then calculates the difference between the preceding angular speed set-point and the angular speed effectively measured by the gyrometers 102. The loop calculates, based on this information, the various set-points for the rotational speed (and thus for the ascensional force), which are sent to the motors 110 to execute the manoeuver demanded by the user and/or planed by the automatic pilot of the drone. Characteristically, the angle-set-point calculation circuit 122 also receives corrections delivered by a wind estimation and compensation circuit 128, which will be described in detail hereinafter.

The horizontal speed control loop 130 uses the vertical video camera 132 and altitude sensors 134 (with an ultrasound telemeter combined with a barometer sensor). A circuit 136 processes the images produced by the vertical camera 132, in combination with the signals of the accelerometer 114 and of the attitude estimation circuit 118, to estimate by means of a circuit 138 the components of the horizontal speed along the two pitch and roll axes of the drone. The estimated horizontal speeds are corrected by the vertical speed estimation given by a circuit 140 and by an estimation of the altitude given by the circuit 142 based on the information of the sensors 134. As regards the vertical displacements of the drone, the user 124 applies commands to an altitude-set-point calculation circuit 144, such set-points being applied to a circuit 146 for calculating the ascensional speed set-point $V_z$ via the altitude correction circuit 148 receiving the altitude estimation given by the circuit 142. The calculated ascensional speed $V_z$ is applied to a circuit 150 that compares this set-point speed to the corresponding speed estimated by the circuit 140 and modifies accordingly the motor command data (circuit 108) so as to increase or decrease the rotational speed of all the motors simultaneously, in order to minimize the difference between the set-point ascensional speed and the measured ascensional speed.

Elaboration of the Drone Attitude Control Set-Points

The way the drone control set-points are elaborated by means of the above-described circuits will now be exposed in a general manner (and in absence of wind). Let's call:
u the component of the horizontal translation speed in the direction of the main axis of the drone (along the roll axis 24);
v the component of the horizontal translation speed in the transverse direction along the pitch axis 22); and
w the vertical translation speed, the whole in the coordinate system {u, v, w} linked to the drone, independent of the inclination of the latter with respect to the reference coordinate system NED.

Each of the four propellers i of the drone (i=1 . . . 4) exerts a torque $\Gamma_i$ and an ascensional thrust force $F_i$ proportional to the square of the rotational speed $\omega_i$ of the motor:

$$\begin{cases} F_i = a\omega_i^2 \\ \Gamma_i = b\omega_i^2 \end{cases}$$

The fundamental relation of dynamics is applied, in projection in the mobile reference coordinate system of the drone, which gives—in the absence of wind—the three following equations:

$$\dot{u} = (rv - qw) - g\sin\theta - C_x u \qquad \text{(Equations 1-3)}$$
$$\dot{v} = (pw - ru) + g\sin\varphi\cos\theta + C_y v$$
$$\dot{w} = (qu - pv) + g\cos\varphi\cos\theta - \frac{1}{m}\sum_{i=1}^{4} a\omega_i^2$$

p, q and r being the angular speeds according to the three axes,
g being the acceleration of the gravity,
$\varphi$ and $\theta$ being the two angles defining the inclination of the drone with respect to the horizontal (Euler angles: if $\psi$ corresponds to a rotation about the axis $Z_{NED}$ of the absolute coordinate system NED, $\theta$ corresponds to a rotation about the axis $Y_{NED}$ rotated by $\psi$, and $\varphi$ corresponds to a rotation about the axis u),
$C_x$ and $C_y$ being the drag coefficients (reflecting the friction forces undergone by the drone) in the two horizontal axes,
a being a coefficient linking the thrust and the ascensional speed to the rotational speed $\omega$, and
m being the mass of the done.

The kinetic moment theorem is likewise applied to the system, still in projection in the mobile reference system, which leads to the three following equations:

$$I_x \dot{p} + qr(I_z - I_y) = la(\omega_2^2 - \omega_4^2) \qquad \text{(Equations 4-6)}$$
$$I_y \dot{q} + pr(I_x - I_z) = la(\omega_1^2 - \omega_3^2)$$
$$I_z \dot{r} + pq(I_y - I_x) = b(\omega_1^2 - \omega_2^2 + \omega_3^2 - \omega_4^2)$$

$I_x$, $I_y$ and $I_z$ being parameters representative of the coefficient of inertia of the drone along the three axes, and l being the distance separating the motor from its centre of gravity.

In these equations, the first term of the left member corresponds to the dynamic moment of the system, the second term represents the contribution of the Coriolis forces to the dynamic moment, and the right member corresponds to the moments exerted by the ascensional forces $F_i$ and the torques $\Gamma_i$ created by the propellers of each of the rotors.

Finally, the following relation is demonstrated, using the three Euler angles $\varphi$, $\theta$ and $\psi$:

$$\dot{\varphi} = p + (q\sin\varphi + r\cos\varphi)\tan\theta \qquad \text{(Equation 7-9)}$$
$$\dot{\theta} = q\cos\varphi - r\sin\varphi$$
$$\dot{\psi} = \frac{q\sin\varphi + r\cos\varphi}{\cos\theta}$$

The behaviour of the system is hence described in total by nine equations with nine unknowns.

In the vicinity of the equilibrium point, with the drone in lift condition at the horizontal (zero speed and inclination):

$$u = v = w = \theta = \varphi = 0$$

The Equations 1-9 become:

$$g = \frac{1}{m}\sum_{1}^{4} a\omega_i^2, \; p = q = r = 0, \; \omega_1 = \omega_3, \; \omega_2 = \omega_4, \; \omega_1 = \omega_2$$

And thus, near the equilibrium point:

$$\omega_1 = \omega_2 = \omega_3 = \omega_4 = \frac{1}{2}\sqrt{\frac{mg}{a}} = \omega_0$$

Let's put $w_i = \omega_i - \omega_0$, with i=1 . . . 4, and apply a first-order linearization to the previous equations about the equilibrium point, the following system of linearized equations is obtained:

$$\begin{cases} \dot{u} = -g(\theta) - C_x * u & \text{(Equations 10-18)} \\ \dot{v} = g(\varphi) + C_y * v \\ \dot{w} = -\frac{2a\omega_0}{m}(w_1 + w_2 + w_3 + w_4) \\ \dot{p} = \frac{la\omega_0}{I_x}(w_2 - w_4) \\ \dot{q} = \frac{la\omega_0}{I_q}(w_1 - w_3) \\ \dot{r} = \frac{b\omega_0}{I_z}(w_1 + w_3 - w_2 - w_4) \\ \dot{\varphi} = p \\ \dot{\theta} = q \\ \dot{\psi} = r \end{cases}$$

Wind Estimation in the Horizontal Plane

The invention proposes a technique of wind estimation based on the dynamic equations of the drone in flight. This dynamic model, the equations of which will be given hereinafter, will be used with a state estimator of the "Kalman filter" type, which is an infinite pulse response filter that estimates the states of a dynamic system (the drone in the present case) based on a series of measurements applied at the input. The general principles of this technique will be found, for example, in R. E. Kalman, *A new Approach to Linear Filtering and Prediction Problems*, Transactions of the ASME—*Journal of Basic Engineering*, Vol. 82 (1960).

In the present case, the Kalman filter will use and estimate six states, i.e.:
  the horizontal components $V_{D/S_X}$ and $V_{D/S_Y}$ of the speed of displacement of the drone relative to the ground (D/S), expressed in the local coordinate system {u, v, w} linked to the body of the drone,
  the horizontal components $V_{A/S_X}$ and $V_{A/S_Y}$ of the speed of air relative to the ground (A/S), expressed in the fixed absolute terrestrial coordinate system NED, and the biases $B_X$ and $B_Y$ of the accelerometer along its axes X and Y. The state vector is hence written:

$$X = \begin{pmatrix} V_{D/S_X} \\ V_{D/S_Y} \\ V_{A/S_X} \\ V_{A/S_Y} \\ B_X \\ B_Y \end{pmatrix}$$

The evolution of the six states of the estimator of the Kalman filter may be predicted by means of the dynamic model describing the behaviour of the drone. The measured values of the speed relative to the ground and of the acceleration of the drone will serve to readjust the predictions given by this estimator, hence allowing i) to improve the accuracy of estimation of the quantities directly measured (filtering function of the estimator), as the speeds $V_{D/S_X}$ and $V_{D/S_Y}$ of displacement of the drone relative to the ground, and ii) to estimate the quantities that are not available to a direct measurement (function of state estimator), as the speed and direction of wind corresponding to the components $V_{A/S_X}$ and $V_{A/S_Y}$.

It is demonstrated that the dynamic model of the drone in flight may be expressed by the following formula:

$$\dot{X} = \begin{pmatrix} \begin{pmatrix} -\frac{C_x}{m} & \omega_z \\ -\omega_z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix} X + \begin{pmatrix} \begin{pmatrix} -\sin(\theta) \\ \sin(\phi) \end{pmatrix} \\ \begin{pmatrix} 0 \\ 0 \end{pmatrix} \\ \begin{pmatrix} 0 \\ 0 \end{pmatrix} \end{pmatrix} \cdot U$$

$\dot{X}$ representing the evolution of the initial value X of the state vector,
the input U of the system being the gravity U=g,
$C_x$ and $C_y$ being the aerodynamic friction coefficients of the drone along its axes u and v,
m being the mass of the drone,
$\phi$, $\theta$ and $\psi$ being the Euler angles (respectively of roll, pitch and yaw) characterizing the attitude of the drone relative to the NED coordinate system,
$\omega_z$ being the rate of rotation about the axis w (yaw rotation movement), and
$R\psi$ being the rotation matrix associated with the angle $\psi$, in dimension 2.

The zero terms of the two sub-matrices come from the fact that, by hypothesis, the wind and the accelerometer bias are considered as being constant over the short term. It will be noted that this does not prevent the estimation of these states because i) the speed of wind is dynamically coupled to the speed of the drone relative to the ground, itself measured, and ii) the accelerometer bias is measured through the acceleration measurement.

Moreover, it will be noted that the two sub-matrices of the above-relation are not constant (which corresponds to a non-stationary Kalman filter), because they depend on the attitude of the drone and on its rotational speed about the yaw axis; but these parameters are supposed to be known by the estimator, insofar as they are in practice measured or estimated within the framework of the drone attitude control.

Insofar as, concretely, the estimator that is used works in discrete time (by successive iterations), it is possible to use in practice a discretized version of the dynamic model, by first-order approximation (relation of the type "following state $X_{t+\delta t}$ as a function of the current state $X_t$"):

$$X_{t+\delta t} = X_t + \dot{X}_t \cdot \delta t$$

$$X_{t+\delta t} = X_t + (AX_t + BU) \cdot \delta t$$

$$X_{t+\delta t} = (Id + A \cdot \delta t) X_t + \delta t \cdot B \cdot U$$

Hence:

$$X_{t+\delta t} = A_d X_t + B_d \cdot U$$

$$A_d = Id + A \cdot \delta t$$

$$B_d = \delta t \cdot B$$

Subsidiarily, it is possible to provide a different dynamic model representing the behaviour of the drone when the latter is on the ground. Indeed, the drone being landed, the wind has hence no influence on it.

To allow the estimations to slowly come back to zero, in particular not to destabilize the bias estimators, a ground dynamic model of the following type will be used:

$$\dot{X} = \begin{pmatrix} \begin{pmatrix} -\frac{1}{\tau} & 0 \\ 0 & -\frac{1}{\tau} \end{pmatrix} & \begin{pmatrix} 0 & 0 \\ 0 & 0 \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} -\frac{1}{\tau} & 0 \\ 0 & -\frac{1}{\tau} \end{pmatrix} & \begin{pmatrix} 0 & 0 \\ 0 & 0 \end{pmatrix} \\ \begin{pmatrix} 0 & 0 \\ 0 & 0 \end{pmatrix} & \begin{pmatrix} 0 & 0 \\ 0 & 0 \end{pmatrix} & \begin{pmatrix} 0 & 0 \\ 0 & 0 \end{pmatrix} \end{pmatrix} X + \begin{pmatrix} \begin{pmatrix} 0 \\ 0 \end{pmatrix} \\ \begin{pmatrix} 0 \\ 0 \end{pmatrix} \\ \begin{pmatrix} 0 \\ 0 \end{pmatrix} \end{pmatrix} \cdot U$$

As the estimator is in this case not able to give a reliable estimation of the wind speed, this allows to force the previously measured wind speed to progressively decrease towards zero by a model of the first order of parameter $\tau$, characteristic time of this decrease, for example $\tau=1$ second. The measurements used by the estimator will now be described.

As regards the acceleration, the latter is given by:

$$Acc_{mes} = \begin{pmatrix} \begin{pmatrix} -\frac{C_x}{m} & \omega_z \\ -\omega_z & -\frac{C_y}{m} \end{pmatrix} & \begin{pmatrix} \frac{C_x}{m} & 0 \\ 0 & \frac{C_y}{m} \end{pmatrix} R_\psi & \begin{pmatrix} 1 & 0 \\ 0 & 1 \end{pmatrix} \end{pmatrix} X + \begin{pmatrix} 0 \\ 0 \end{pmatrix} \cdot U$$

The last term of this relation serves to take into account the fact that an accelerometer measures the non-gravitational forces that it undergoes. It is implicitly taken advantage of this: indeed, if the Equations 10 and 11 are applied to the accelerometer measurement system, the latter measures only the aerodynamic friction forces; the accelerometer hence measures a magnitude proportional to the wind speed by a factor $C_x/m$ or $C_y/m$ according to the considered axis (to within the construction bias).

The relation hereinafter may be rewritten as a function of the state vector:
when the drone is in flight:

$$Acc_{mes} = \begin{pmatrix} Acc_{mes_X} \\ Acc_{mes_Y} \\ Acc_{mes_Z} \end{pmatrix} = \begin{pmatrix} B_X \\ B_Y \\ B_Z \end{pmatrix} + \begin{pmatrix} A_{D/S_x} \\ A_{D/S_y} \\ A_{D/S_z} \end{pmatrix}_d - g \cdot R_{\phi,\theta,\psi} \begin{pmatrix} 0 \\ 0 \\ 1 \end{pmatrix}$$

and, likewise, when the drone is on the ground (landed):

$$Acc_{mes} = \left( \begin{pmatrix} 0 & 0 \\ 0 & 0 \end{pmatrix} \begin{pmatrix} 0 & 0 \\ 0 & 0 \end{pmatrix} \begin{pmatrix} 1 & 0 \\ 0 & 1 \end{pmatrix} \right) X + \begin{pmatrix} \sin(\theta) \\ -\sin(\phi) \end{pmatrix} \cdot U$$

As regards the speed, the latter is measured in the coordinate system {u, v, w} linked to the drone thanks to the on-board vertical-view camera giving an image of the ground. This image is analysed by algorithms such as those described in the above-mentioned EP 2 400 460 A1, which estimates the displacement of the scene picked up by the camera from a following image and applies to this estimated displacement a scale factor that is function of the altitude, itself estimated by merging the data produced by an ultrasound telemeter and by a barometer sensor.

The speed of the drone expressed in its coordinate system being an element of the state vector, the writing of the measurement as a function of the state vector is direct:

$$V_{mes} = \left( \begin{pmatrix} 1 & 0 \\ 0 & 1 \end{pmatrix} \begin{pmatrix} 0 & 0 \\ 0 & 0 \end{pmatrix} \begin{pmatrix} 0 & 0 \\ 0 & 0 \end{pmatrix} \right) X + \begin{pmatrix} 0 \\ 0 \end{pmatrix} \cdot U$$

Figure 3:
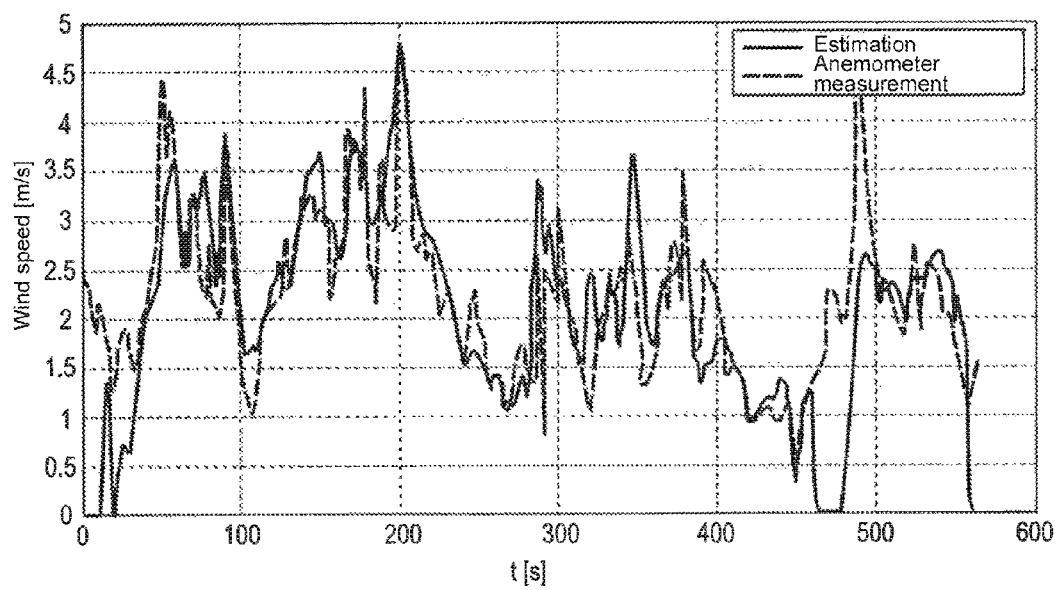
FIGS. 3 and 4 are comparative records, of the modulus of the wind speed and of the wind direction, respectively, of the simultaneously estimated and measured in real conditions values, showing the pertinence of the estimation method according to the invention.
Figure 4:
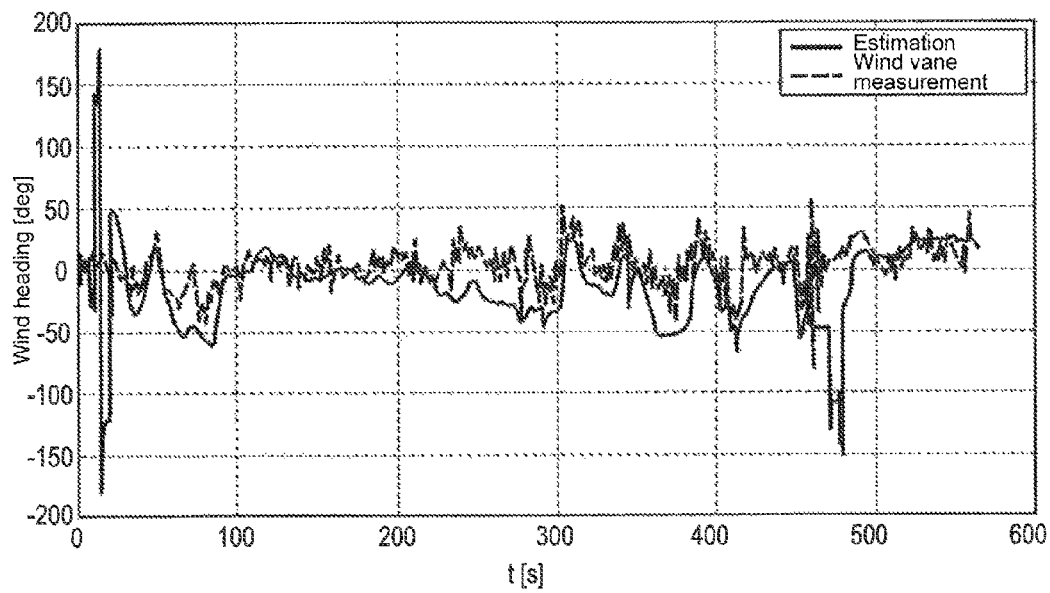

FIGS. 3 and 4 are comparative records, of the modulus of the wind speed and of the wind direction, respectively, of the simultaneously estimated and measured in real conditions values.

On these figures have been shown in full line the estimated measurement of the wind (speed, or orientation expressed in heading angle), and in dotted line the values really measured by an anemometer and by a windvane, respectively.

These figures allow to verify the excellent quality of the estimation obtained by the method of the invention, reached after a few tens of seconds only, a time necessary to the stabilisation of the filter.

The measurements at t=470-480 s and t>560 s correspond to a state of the drone landed on the ground, a configuration that does not allow to produce a wind speed estimation. However, as indicated hereinabove, the use of a specific dynamic model for the drone on the ground allows to force the decrease of the wind speed towards zero, hence avoiding any destabilisation of the accelerometer bias estimators.

Use of the Wind Speed Estimation—Wind Compensation

The wind estimation has several uses:
making a compensation allowing to stabilise the drone against the wind, in controlled mode or in auto-piloted mode;
merging the measured speed and acceleration, taking into account the estimated wind, to control the auto-piloted fixed point;
estimating the accelerometer construction bias provided to the attitude estimator, hence allowing to obtain an efficient estimation of the attitude, not disturbed by the wind, even in presence of this latter.

A wind compensation method will now be described.

This wind compensation method is advantageously implemented based on the estimation obtained as described hereinabove, but in a nonlimitative way, insofar as it can be implemented with other technique of wind estimation.

The wind compensation consists in determining for the drone a reference pitch about which it will be controlled, either in controlled-flight mode or in auto-piloted fixed-point mode:
in controlled flight, the open-loop reference will be added to the set-points of the pilot, so as to support the drone in front of wind and, conversely, to slow it in the wind direction, and
upon switching to the fixed-point condition, it will possible to reach more rapidly the stabilisation of the drone, the compensation being as reactive as the estimation.

Figure 5:
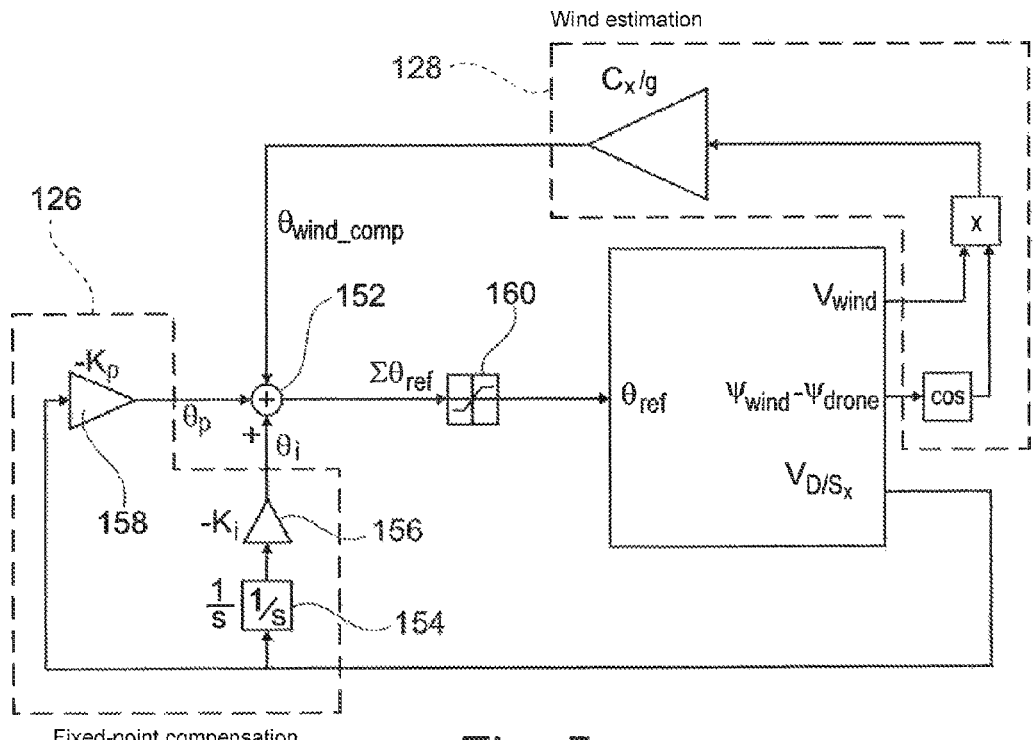
FIG. 5 is a functional schematic representation illustrating the wind estimation and compensation loops, for an auto-piloted fixed-point flight configuration of the drone.

FIG. 5 is a functional schematic representation illustrating the wind estimation and compensation loops, along the axis u, for an auto-piloted fixed-point flight configuration of the drone. The servo-control is identical along the axis v, the x or θ terms being substituted by y or ϕ terms, and the cosine function being replaced by the sine function, respectively.

Figure 6:
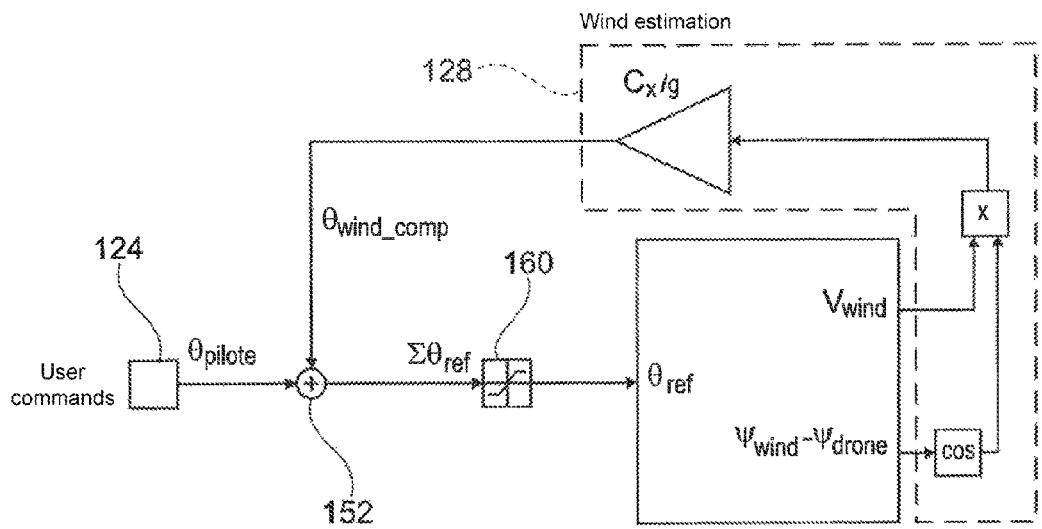
FIG. 6 is a functional schematic representation illustrating the wind estimation loop, for a controlled-flight configuration of the drone.

FIG. 6 is homologous to FIG. 5, for a controlled-mode flight configuration of the drone.

The blocks 124 (user commands applied in controlled mode), 126 (correction of the fixed point in auto-piloted mode) and 128 (wind estimation based on attitude and speed measurements, the wind estimation also including the decorrelation of the accelerometer biases) illustrated in the overall scheme of FIG. 2 are also represented in these two FIGS. 5 and 6.

The fixed-point compensation loop 126 comprises an integrator stage 154 with a gain 156 and a proportional stage 158. The output set-point of the adder stage 152 is applied through a stage 160 limiting the excursion of the set-point effectively applied to the control loop of the drone motors. The compensation term applied to the adder 152 for each of the axes u and v is:

$$\theta_{wind\_comp} = \frac{C_x}{g} V_{wind} \cdot \cos(\varphi_{wind} - \varphi_{drone})$$

$$\phi_{wind\_comp} = -\frac{C_x}{g} V_{wind} \cdot \sin(\varphi_{wind} - \varphi_{drone})$$

$V_{wind}$ being the modulus of the estimated speed of wind, $C_x$ being the drag coefficient of the drone, $\psi_{wind}$ being the heading angle of the wind direction and $\psi_{drone}$ being the heading angle of the drone direction.

The invention claimed is:
1. A method for piloting a rotary-wing drone with multiple rotors driven by respective motors able to be controlled to pilot the drone in attitude and speed, said method being performed by one or more control loops, comprising software embedded into one or more circuits of a control and servo-control of the drone, said method comprising:
generating angular set-points and applying the set-points to a control loop of the drone motors, the set-points being adapted to control the attitude of the drone about pitch and roll axes, establishing at least one dynamic model of the drone, describing horizontal speed components of the drone as a function of the drag coefficients and the mass of the drone, of the Euler angles characterizing the attitude of the drone with respect to an absolute terrestrial coordinate system, as well as of the rotational speed of the drone about a vertical yaw axis;

measuring the aerodynamic drag force of the drone, derived from a measurement of acceleration of the drone;

measuring the relative speed of the drone with respect to the ground; and applying to said dynamic model of the drone, by a Kalman predictive filter, said measurements of aerodynamic drag force and of speed relative to the ground, so as to produce an estimation of the horizontal speed components of the cross wind, to control the position of the rotary-wing drone in air, wherein the Kalman predictive filter is a six-state filter, such states comprising:

two components of the speed of displacement of the drone relative to the ground, expressed in a coordinate system linked to the drone, two components of the speed of wind relative to the ground, expressed in an absolute terrestrial coordinate system linked, and two horizontal components of drone accelerometer bias.

2. The method of claim 1, wherein the dynamic model of the drone in flight uses a measurement of acceleration of the drone as a measurement proportional to the speed of air in the coordinate system of the drone.

3. The method of claim 1, further comprising a step of compensation for the effect of cross wind on the positioning and the displacements of the drone, by generating corrective set-points, function of the estimated components of horizontal speed of the cross wind, and combining the corrective set-points to the angular set-points of pitch and roll applied to the control loop of the drone motors to control the position of the rotary-wing drone.

4. The method of claim 3, wherein the corrective set-points are of the type:

$$\theta_{wind\_comp} = \frac{Cx}{g} V_{wind} \cdot \cos(\psi_{wind} - \psi_{drone})$$

$$\phi_{wind\_comp} = -\frac{Cx}{g} V_{wind} \cdot \sin(\psi_{wind} - \psi_{drone})$$

$V_{wind}$ being the modulus of the estimated wind speed, Cx being the drag coefficient of the drone, $\psi_{wind}$ being the heading angle of the wind direction and $\psi_{drone}$ being the heading angle of the drone direction.

5. The method of claim 3, wherein the compensation step further comprises the definition for the drone of an open-loop reference pitch for the drone.

6. The method of claim 3, wherein, when the drone is in user-controlled flight, the corrective set-points are combined to the piloting set-points applied by the user.

7. The method of claim 3, wherein, when the drone is in auto-piloted standstill flight, the corrective set-points are combined to fixed-point stabilization set-points produced in response to a measurement of the horizontal speed of the drone relative to the ground ($V_{D/S_X}$, $V_{D/S_Y}$).

8. A method for piloting a rotary-wing drone with multiple rotors driven by respective motors able to be controlled to pilot the drone in attitude and speed, said method being performed by one or more control loops, comprising software embedded into one or more circuits of a control and servo-control of the drone, said method comprising:

generating angular set-points and applying the set-points to a control loop of the drone motors, the set-points being adapted to control the attitude of the drone about pitch and roll axes, establishing at least one dynamic model of the drone, describing horizontal speed components of the drone as a function of the drag coefficients and the mass of the drone, of the Euler angles characterizing the attitude of the drone with respect to an absolute terrestrial coordinate system, as well as of the rotational speed of the drone about a vertical yaw axis;

measuring the aerodynamic drag force of the drone, derived from a measurement of acceleration of the drone;

measuring the relative speed of the drone with respect to the ground; and applying to said dynamic model of the drone, by a Kalman predictive filter, said measurements of aerodynamic drag force and of speed relative to the ground, so as to produce an estimation of the horizontal speed components of the cross wind, wherein the Kalman predictive filter is a six-state filter, such states comprising:

two components of the speed of displacement of the drone relative to the ground, expressed in a coordinate system linked to the drone, two components of the speed of wind relative to the ground, expressed in an absolute terrestrial coordinate system linked, and two horizontal components of drone accelerometer bias; and affecting the respective motors of the rotary-wing drone with multiple rotors and controlling the position of the rotary-wing drone in air using the generated angular set-points, the established at least one dynamic model of the drone, the measured aerodynamic drag force of the drone, the measured relative speed of the drone with respect to the ground and applied to said dynamic model of the drone, by the Kalman predictive filter, of said measured aerodynamic drag force and of speed relative to the ground.

9. A drone comprising:

a rotary-wing drone body; and multiple rotors driven by respective motors controlled to pilot the drone in attitude and speed;

one or more control loops, comprising software embedded into one or more circuits of a control and servo-control of the drone, the one or more control loops configured to:

generate angular set-points and apply the set-points to a control loop of the drone motors, the set-points being adapted to control the attitude of the drone about pitch and roll axes, establish at least one dynamic model of the drone, describing horizontal speed components of the drone as a function of i) the drag coefficients and ii) the mass of the drone, of the iii) Euler angles characterizing the attitude of the drone with respect to an absolute terrestrial coordinate system, as well as of iv) the rotational speed of the drone about a vertical yaw axis, wherein the establishment of at least one dynamic model of the drone comprises the establishment of two distinct models, with: i) a dynamic model of the drone in flight, and ii) a dynamic model of the drone on the ground, the models being used selectively as a function of the state of the drone, measure the aerodynamic drag force of the drone, derived from a measurement of acceleration of the drone;

measure the relative speed of the drone with respect to the ground; and apply to said dynamic model of the drone, by a Kalman predictive filter, said measurements of aerodynamic drag force and of speed relative to the ground, so as to produce an estimation of the horizontal speed components of the cross wind, to control the position of the drone in air, wherein, the Kalman predictive filter is a six-state filter, such states comprising:

two components of the speed of displacement of the drone relative to the ground, expressed in a coordinate system linked to the drone, two components of the speed of wind relative to the ground, expressed in an absolute terrestrial coordinate system linked, and two horizontal components of drone accelerometer bias.

10. The drone of claim 9 further comprising at least one camera to acquire at least one image.

* * * * *